United States Patent [19]

Pistor

[11] Patent Number: 4,760,267

[45] Date of Patent: Jul. 26, 1988

[54] METHOD OF CREATING A SIMULATED INFRARED IMAGE USING CONVENTIONAL BLACK AND WHITE FILM

[75] Inventor: Helmut H. Pistor, Fairfax, Va.

[73] Assignee: The United States of America as represented by the Secretary of the Army, Washington, D.C.

[21] Appl. No.: 31,624

[22] Filed: Mar. 30, 1987

[51] Int. Cl.[4] .......................................... G01M 11/00

[52] U.S. Cl. .......................... 250/504 R; 250/493.1; 250/252.1

[58] Field of Search ............ 250/504 R, 504 H, 493.1, 250/252.1

[56] References Cited

U.S. PATENT DOCUMENTS

| | | | |
|---|---|---|---|
| 4,362,796 | 12/1982 | Monroe | 430/12 |
| 4,639,603 | 1/1987 | Pistor | 250/504 R |

*Primary Examiner*—Carolyn E. Fields
*Assistant Examiner*—John A. Miller
*Attorney, Agent, or Firm*—Max L. Harwell; John E. Holford; Anthony T. Lane

[57] ABSTRACT

A method of forming infrared light patterns is provided to simulate the radiation from actual scenes encountered by infrared image detection systems. The patterns are formed using inexpensive black and white film treated with a silver reducing agent and certain photographic toners to produce specularly reflective images, which strongly reflect far-infrared.

9 Claims, 1 Drawing Sheet

METHOD OF CREATING A SIMULATED INFRARED IMAGE USING CONVENTIONAL BLACK AND WHITE FILM

The invention described herein may be manufactured, used, and licensed by the U.S. Government for governmental purposes without the payment of any royalties thereon.

BACKGROUND OF THE INVENTION

1. Field of the Invention

The present invention pertains to infrared image detection systems. In particular, it involves a method of IR image simulation and a method for evaluating such systems in a laboratory environment.

2. Prior Art

Laboratory testing of infrared imaging systems has been conducted using heated objects which are moved about in front of the imager to check temporal, spatial and temperature responses. To actually check the system operation in the real world, it has been necessary to place the system in its final environment such as an aircraft or tank in battlefield situations. Not only is this expensive, but it unduly extends development time.

The present inventor has found one solution to this problem using a special type of black and white silver diffusion transfer photography. The film used, however, is much more expensive than conventional black and white film, is available only in limited formats, and requires special equipment for processing. The above film and usage is disclosed in U.S. Pat. No. 4,639,603 for an "IR IMAGE SOURCE USING A SPECULARLY REFLECTIVE TRANSPARENCY" issued to the present inventor on 27 Jan. 1987. Applicant has since discovered that similar results can be obtained using ordinary black and white film with special processing.

SUMMARY OF THE INVENTION

The present invention provides simulated infrared (IR) images of real scenes by using an IR imager to obtain a visible image of an IR scene. The visible image is then photographed using conventional black and white film. The film is then specially processed to obtain a specularly reflective image. Finally, the simulated IR image is formed by reflecting IR from the image surface of the film, or passing IR through the film.

BRIEF DESCRIPTION OF THE DRAWINGS

The invention is best understood with reference to the accompanying drawings wherein.

DESCRIPTION OF THE PREFERRED EMBODIMENT

Figure 1:
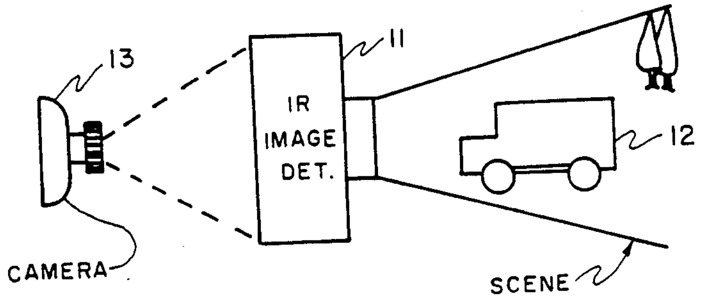
FIG. 1 shows an infrared to visible photographic system focused on a typical IR radiating scene.

Referring to FIG. 1 there is shown an IR (infrared) image detector. This device may be used to perform step A in the Program Step Chart on Page 3. An imager such as the Army's Forward Looking Infrared system FLIR uses IR optics to form an image of a target such as truck 12 against backgrounds such as trees, shrubbery, snow, rocks and soil. The image is focused on an array containing as many as 250,000 individual detectors. The imager then generates a video signal representing the invisible IR intensity pattern from the scene. This signal can simply be recorded on video tape, but more often (step B) is fed to a black and white video monitor, which may or may not be part of the image detector. The detectors are sensitive to peak blackbody radiations at temperatures from −50° to 200° (F.).

Figure 2:
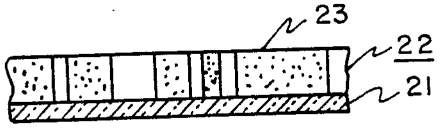
FIG. 2 shows a developed negative transparency-type black and white photographic film exposed in the system of FIG. 1.

In FIG. 1, the monitor is assumed to be on the detector or imager. The visible pattern on the monitor can be focused on film (step C) using a camera 13. As shown in FIG. 2, this film can be any of the inexpensive black and white films commercially available, having a polyester backing 21 and forming final images of colloidal silver 23 suspended in an emulsion layer 22. The film is developed (step D) to produce this image, but not necessarily fixed to remove the remaining unexposed silver salts (halides). Fixing the film (step E1) is optional and, if performed, is followed by a bleaching step which converts the image of colloidal silver to silver salts. Photographic bleaches for this purpose, which is actually an extreme reduction in contrast, are readily available at photographic supply houses.

PROGRAM STEP CHART

A. Electronically detect and store invisible pattern of IR intensity from scene.
B. Convert invisible pattern to visible light pattern.
C. Focus light pattern on film.
D. Develop film.
E1. (Optional) Fix film and bleach colloidal silver to silver salts (Negative).
E2. (Optional) Etch away colloidal silver (Positive).
F. Reduce remaining silver salts to thin specularly reflecting silver flakes or sheets.
G1. (Optional) Gold tone the silver flakes.
G2. (Optional) Coat film with protection layer of wax or other IR transparent material.
H. Install film in IR simulator with IR source.
I. Test imaging systems with simulator using IR projected through film and/or reflected from silver image.

The materials needed to perform steps E2 and F are described in U.S. Pat. No. 4,362,796, "PROCESS OF MAKING PHOTOGRAPHIC PRINTS SIMULATING DEPTH AND RESULTANT ARTICLE", issued to Robert Monroe on 7 Dec. 1982. Step E2 is also optional and is used to produce a positive image in silver salts (the original unexposed halides) as opposed to the similar negative image produced by step E1, both of which are normally invisible.

Figure 3:
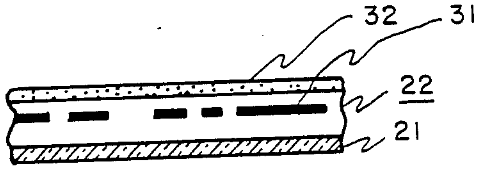
FIG. 3 shows the film from FIG. 2 after additional processing steps.

As shown in FIG. 3, the photographic processing is completed (step F) by reducing the silver salts or halides to specularly reflecting sheets or flakes 31 of pure silver. Performing both E1 and E2 is impractical since step E1 negates the purpose of E2. If both steps are omitted, an interesting image in black and silver is obtained, which can be utilized in the present invention, as well as the negative and positive images resulting from steps E1 and E2, respectively. It is believed that the flakes 31 form near the top of the emulsion layer, because there is a fairly rapid erosion of the mirror-like surfaces, if the emulsion surface remains exposed to the atmosphere. This can be avoided by using a non-reactive toner like gold 31 (step G1) and/or by applying a thin impermeable layer 32 (step G2) of wax or polymer to the emulsion surface. The film is then inserted in a simulator (step H) and used to demonstrate and test IR imagers or IR to visible convertors (step I).

Figure 4:
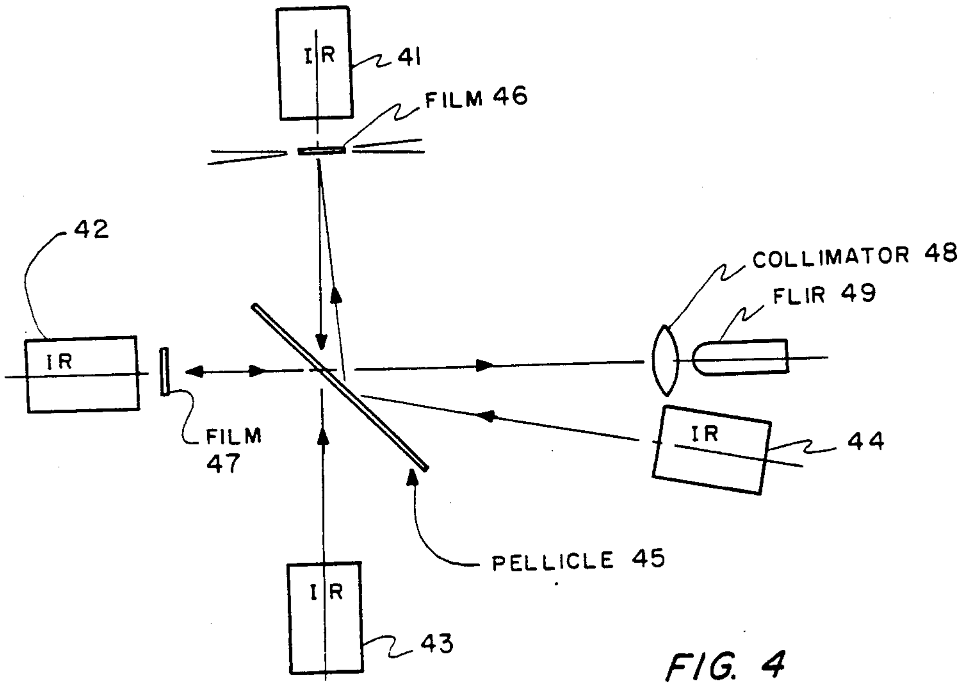
FIG. 4 shows a test arrangement for regenerating the IR image radiated by the scene to the system in FIG. 1.

FIG. 4 shows a scene regenerator using more than one film. There are four IR sources 41–44 shown, two for each of the sample films 46 and 47. A pellicle 45 is used to direct and combine the radiations from the various sources. Sources 41 and 42 transmit through the films and sources 43 and 44 are reflected from the film emulsion surfaces, which face the pellicle. All transmitted and reflected IR images are directed toward the collimator lens and are focused as a combined image on the detector array in the imager. The contrast of the combined image can be controlled by varying the relative intensity of the various sources. If needed, the contrast can be completely reversed. The sample films may be, for example, positive and negative images of a scene including a hot object against a relatively colder background. The combined image can then simulate changes in solar heating and ambient temperatures of this specific scene. The films can be motion pictures to provide temporal data. Special glasses and crystalline materials with low IR absorption factors can also be used as backing materials, if extremely intense IR sources are required. Projection systems tested to date have shown no heating problems or loss of contrast using commercially available films with polymer backing layers.

I claim:

1. The method of creating a simulated infrared image of an actual scene, comprising the steps of;

detecting a first intensity pattern of infrared radiation of a selected wavelength band from said scene;

creating a second pattern of visible light corresponding to said first pattern;

projecting said second pattern on a sheet of photographic film having only a backing and an emulsion layer;

processing said film to produce a third pattern of specularly reflecting silver corresponding to said first and second patterns, and;

uniformly illuminating at least one side of said film with radiation at said selected wavelength band to produce a fourth pattern of infrared light corresponding to said first pattern.

2. The method according to claim 1 wherein said third pattern is a positive photographic image of said second pattern, and the step of illuminating includes:

illuminating said third pattern from the emulsion layer side of said film to reflect a positive image.

3. The method according to claim 1 wherein said third pattern is a negative photographic image of said second pattern, and the step of illuminating includes:

illuminating said third pattern from the backing side of said film to produce a positive image.

4. The method according to claim 1 wherein said step of illuminating includes:

illuminating both sides of said film from separate infrared sources independently variable over the same intensity range, wherein the contrast of said fourth pattern can be varied from a maximum contrast positive image to a maximum contrast negative image.

5. The method according to claim 1 wherein said sheet of film comprises a reel of movie film and further includes:

repeating said steps on substantially the same scene at intervals of less that one-tenth of a second.

6. The method according to claim 1 wherein said step of processing said film includes:

applying a toner to said film to cover said silver with a less reactive metal.

7. The method according to claim 1 wherein:

said less reactive metal is gold.

8. The method according to claim 1 wherein said step of processing said film includes:

applying a protective layer of impermeable material on the emulsion layer of said film.

9. The method according to claim 1, wherein the step of detecting a first intensity pattern and the step of creating a second pattern of visible light comprise;

focusing a FLIR type far-infrared detector on said scene.

* * * * *